(12) United States Patent  (10) Patent No.: US 7,525,047 B2
Iben et al.  (45) Date of Patent: *Apr. 28, 2009

(54) CABLE HAVING TRANSLUCENT, SEMI-TRANSPARENT OR TRANSPARENT ESD DISSIPATIVE LAYER AND/OR METALLIC LAYER

(75) Inventors: Icko E. T. Iben, Santa Clara, CA (US); Sassan K. Shahidi, San Jose, CA (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/781,850

(22) Filed: Jul. 23, 2007

(65) Prior Publication Data

US 2007/0284133 A1  Dec. 13, 2007

Related U.S. Application Data

(63) Continuation-in-part of application No. 11/626,802, filed on Jan. 24, 2007, which is a continuation of application No. 10/902,653, filed on Jul. 28, 2004, now Pat. No. 7,223,922.

(51) Int. Cl.
*H01B 7/08* (2006.01)
(52) U.S. Cl. .................. 174/117 FF; 174/254
(58) Field of Classification Search ......... 174/117 FF, 174/254, 256
See application file for complete search history.

(56) References Cited

U.S. PATENT DOCUMENTS 4,553,190 A * 11/1985 Mueller .................. 361/212

4,692,566 A  9/1987 Kauffman ............... 174/117
5,646,801 A  7/1997 Boigenzahn et al. ..... 360/97.01
5,774,291 A  6/1998 Contreras et al. ........... 360/67

(Continued)

FOREIGN PATENT DOCUMENTS

JP  2003124581  *  4/2003

OTHER PUBLICATIONS

"P1: Choosing the Right Static Bag" SCC Technical Bulletin pp. 1-4, 1996.
"Mylar® Polyester Film" DuPont Automotive: Mylar® Polyester Film, no date.
"Anixter Wire & Cable Handbook" www.anixter.com/AXECOM/AXEDocLib.nsf(UnID)/8BBE048F71DA74DE80256F2D00495DA8/$file/WCH_10.pdf, 1996.

(Continued)

*Primary Examiner*—Chau N Nguyen
(74) *Attorney, Agent, or Firm*—Zilka-Kotab, PC

(57) ABSTRACT

A cable in one embodiment includes a plurality of leads; and an electrostatic discharge (ESD) dissipative layer operatively coupled to the leads, the ESD dissipative layer being characterized as being at least one of translucent, semi-transparent or transparent. A cable in another embodiment includes a plurality of leads; an ESD dissipative layer operatively coupled to the leads, the ESD dissipative layer; and a metallic layer operatively coupled to the leads, the metallic and ESD dissipative layers being characterized as being at least one of translucent, semi-transparent or transparent. A cable in another embodiment includes a plurality of leads; a metallic layer operatively coupled to the leads, the metallic layer being characterized as being at least one of translucent, semi-transparent or transparent, wherein the metallic layer has a volume resistivity of greater than $1 \times 10^4$ ohm·cm as defined by ANSI/EIA-541-1988; and an insulating layer positioned between the metallic layer and the leads.

18 Claims, 5 Drawing Sheets

U.S. PATENT DOCUMENTS

| | | | |
|---|---|---|---|
| 6,571,205 B1 | 5/2003 | Doucet et al. | 703/24 |
| 7,223,922 B2 * | 5/2007 | Bandy et al. | 174/254 |
| 2003/0031934 A1 * | 2/2003 | Akbar | 430/5 |
| 2003/0062194 A1 * | 4/2003 | Dodsworth et al. | 174/256 |

* cited by examiner

CABLE HAVING TRANSLUCENT, SEMI-TRANSPARENT OR TRANSPARENT ESD DISSIPATIVE LAYER AND/OR METALLIC LAYER

RELATED APPLICATIONS

This application is a continuation-in-part of U.S. patent application Ser. No. 11/626,802, filed Jan. 24, 2007, which is a continuation of U.S. patent application Ser. No. 10/902,653, filed Jul. 28, 2004, now U.S. Pat. No. 7,223,922, both of which are herein incorporated by reference.

FIELD OF THE INVENTION

The present invention relates to cables, and more particularly, this invention relates to cables having a translucent, semi-transparent or transparent electrostatic discharge (ESD) conductive layer.

BACKGROUND OF THE INVENTION

Magnetic head-based systems have been widely accepted in the computer industry as a cost-effective form of data storage. In a magnetic tape drive system, a magnetic tape containing a multiplicity of laterally positioned data tracks that extend along the length of the tape is drawn across a magnetic read/write transducer, referred to as a magnetic tape head. The magnetic tape heads can record and read data along the length of the magnetic tape surface as relative movement occurs between the heads and the tape.

In a magnetic disk drive system, a magnetic recording medium in the form of a disk rotates at high speed while a magnetic head "flies" slightly above the surface of the rotating disk. The magnetic disk is rotated by means of a spindle drive motor.

Magnetoresistive (MR) sensors are particularly useful as read elements in magnetic heads, used in the data storage industry for high data recording densities. Three examples of MR materials used in the storage industry are anisotropic magnetoresistive (AMR), giant magnetoresistive (GMR) and tunneling magnetoresistive (TMR). An MR sensor is one whose resistance is changed by a magnetic field. MR, e.g., AMR, GMR and TMR, sensors are deposited as small and thin multi-layered sheet resistors on a structural substrate. The sheet resistors can be coupled to external devices by contact to metal pads which are electrically connected to the sheet resistors. MR sensors provide a high output signal which is not directly related to the head velocity as in the case of inductive read heads.

To achieve the high areal densities required by the data storage industry, the sensors are made with commensurately small dimensions. The smaller the dimensions, the more sensitive the thin sheet resistors become to damage from spurious current or voltage spikes.

A major problem that is encountered during manufacturing, handling and use of MR sheet resistors as magnetic recording transducers is the buildup of electrostatic charges on the various elements of a head or other objects which come into contact with the sensors, particularly sensors of the thin film type, and the accompanying spurious discharge of the static electricity thus generated. Static charges may be externally produced and accumulate on instruments used by persons performing head manufacturing or testing function. These static charges may be discharged through the head, causing physical and/or magnetic damage to the sensors.

As described above, when a head is exposed to voltage or current inputs which are larger than that intended under normal operating conditions, the sensor and other parts of the head may be damaged. This sensitivity to electrical damage is particularly severe for MR read sensors because of their relatively small physical size. For example, an MR sensor used for high recording densities for magnetic tape media (on the order of 25 MBytes/cm$^2$) are patterned as resistive sheets of MR and accompanying materials, and will have a combined thickness for the sensor sheets on the order of 500 Angstroms (Å) with a width of a few microns (μm) and a height on the order of 1 μm. Sensors used in extant disk drives are even smaller. Discharge currents of tens of milliamps through such a small resistor can cause severe damage or complete destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded. Short time current or voltage pulses which cause extensive physical damage to a sensor are termed electrostatic discharge (ESD) pulses.

One major source of ESD damage is associated with tribo-charging of the flexible cables used to attach the heads to the external devices. High current-dissipative currents sufficient to damage a head result when the cables are tribocharged and the distal end of the cable makes electrical contact with an external device or piece of metal. The resultant discharge may result in damage as described above.

SUMMARY OF THE INVENTION

A cable having an electrostatic discharge (ESD) dissipative layer according to one embodiment includes a plurality of leads; and an ESD dissipative layer operatively coupled to the leads, the ESD dissipative layer being characterized as being at least one of translucent, semi-transparent or transparent.

A cable having an ESD dissipative layer according to another embodiment includes a plurality of leads; an ESD dissipative layer operatively coupled to the leads, the ESD dissipative layer being characterized as being at least one of translucent, semi-transparent or transparent; and a metallic layer operatively coupled to the leads, the metallic layer being characterized as being at least one of translucent, semi-transparent or transparent.

A cable having a metallic layer according to yet another embodiment includes a plurality of leads; a metallic layer operatively coupled to the leads, the metallic layer being characterized as being at least one of translucent, semi-transparent or transparent, wherein the metallic layer has a volume resistivity of greater than 1×10$^4$ ohm·cm as defined by ANSI/EIA-541-1988; and an insulating layer positioned between the metallic layer and the leads.

A method for visually inspecting leads of a cable having an electrostatic discharge (ESD) dissipative layer according to a further embodiment includes visually inspecting a cable having a plurality of leads and an ESD dissipative layer operatively coupled to the leads through the ESD dissipative layer, wherein the ESD dissipative layer is characterized as being at least one of translucent semi-transparent or transparent; and determining whether any of the leads fail to comply with a design specification thereof.

Other aspects and advantages of the present invention will become apparent from the following description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
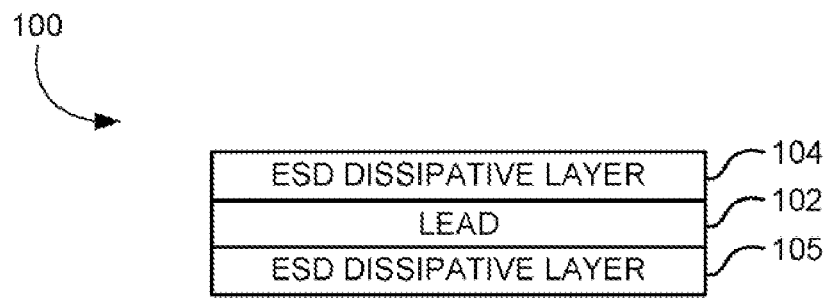
FIG. 1 is a simplified partial cross sectional view, not to scale, of a cable having an ESD dissipative layer according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meaning understood by those skilled in the art and/or as defined in dictionaries, treatises, etc.

In the drawings, like and equivalent elements are numbered the same throughout the various figures.

The following description discloses several preferred embodiments of cables having a translucent, semi-transparent or transparent ESD dissipative portion and/or metallic layer for protecting delicate components of an electronic device from ESD and/or Electrical Overstress (EOS) damage.

Figure 2:
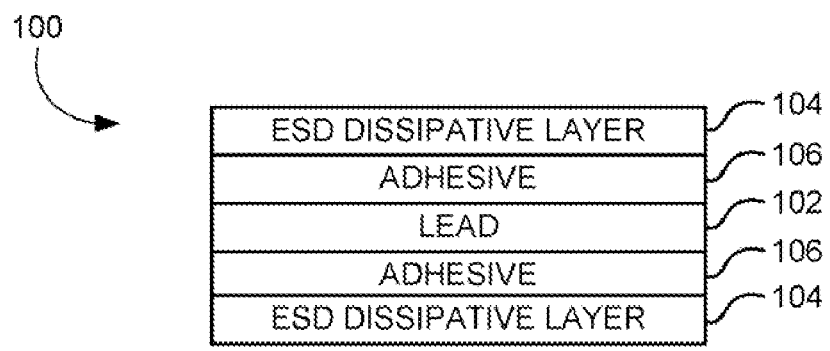
FIG. 2 is a simplified partial cross sectional view, not to scale, of a cable having ESD dissipative layers according to one embodiment.
Figure 3:
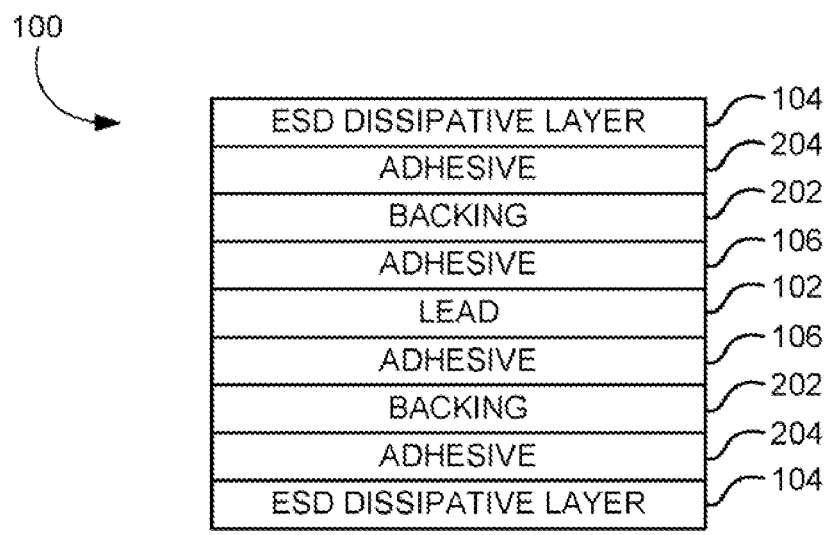
FIG. 3 is a simplified partial cross sectional view, not to scale, of a cable having ESD dissipative layers according to one embodiment.

One general embodiment of the present invention, which can be described for example with reference to FIGS. 1-3, includes cable 100 having an electrostatic discharge (ESD) dissipative layer. The cable 100 includes a plurality of leads 102 and an ESD dissipative layer 104 operatively coupled to the leads 102, the ESD dissipative layer 104 being characterized as being at least one of translucent, semi-transparent or transparent.

Figure 4:
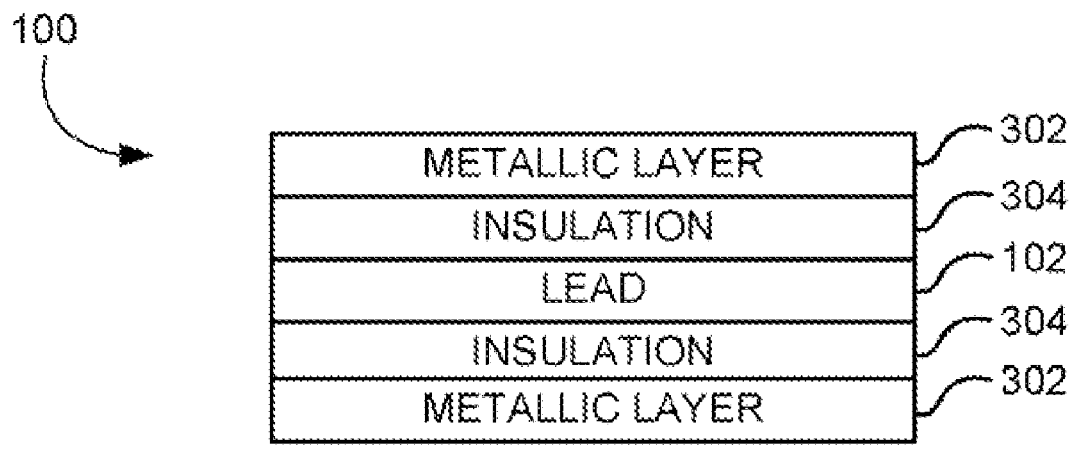
FIG. 4 is a simplified partial cross sectional view, not to scale, of a cable having metallic layers according to one embodiment.

Another general embodiment of the present invention, which can be described for example with reference to FIG. 4, includes a cable 100 having an ESD dissipative layer. The cable 100 includes a plurality of leads 102 and a metallic layer 302 operatively coupled to the leads 102, the metallic layer 302 being characterized as being at least one translucent, semi-transparent or transparent. An insulation layer 304 may be positioned between the leads 102 and the metallic layer 302 to electrically isolate the metallic layer 302 from the leads 102.

Figure 5:
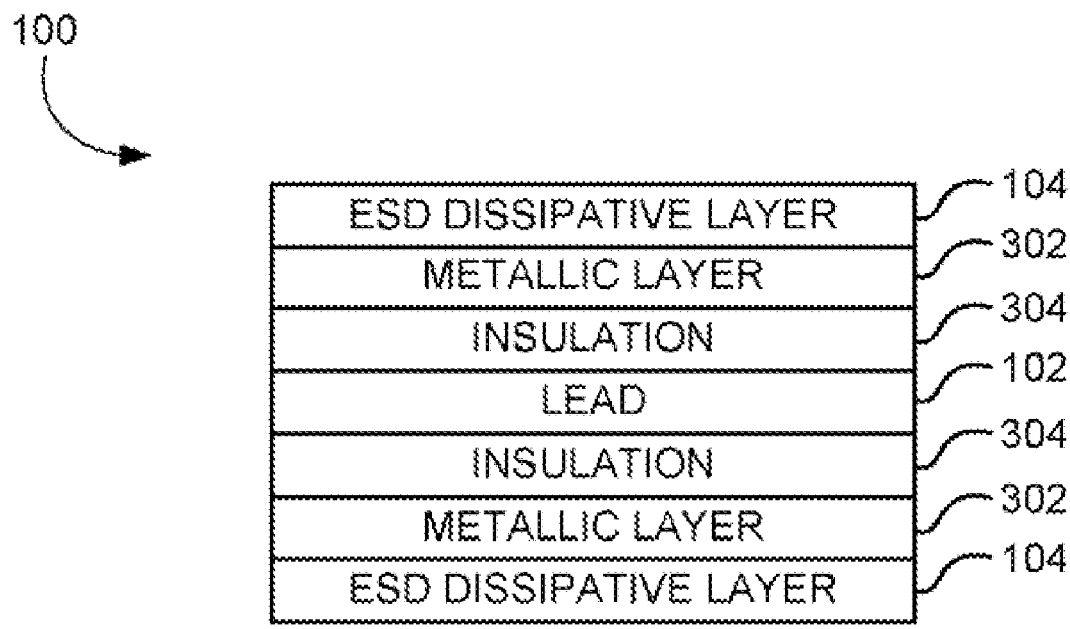
FIG. 5 is a simplified partial cross sectional view, not to scale, of a cable having ESD dissipative layers and metallic layers according to one embodiment.
Figure 6:
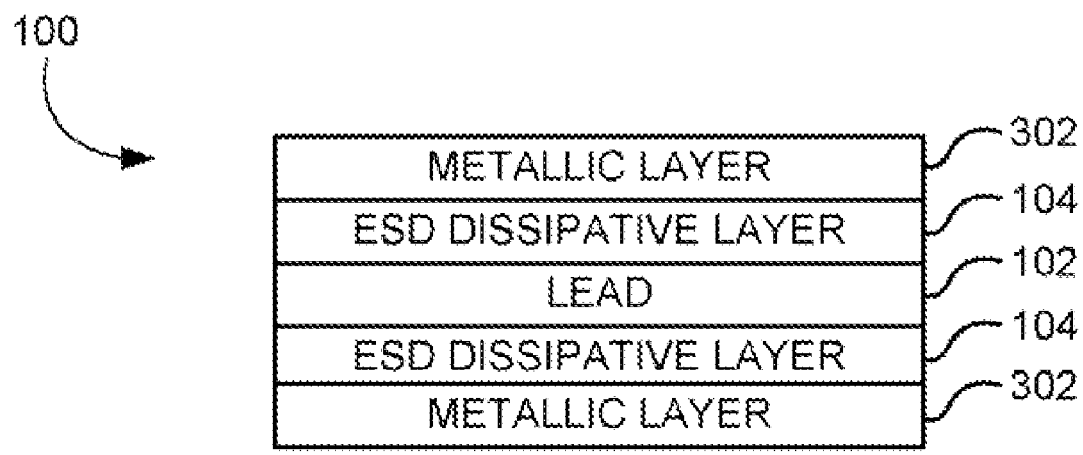
FIG. 6 is a simplified partial cross sectional view, not to scale, of a cable having ESD dissipative layers and metallic layers according to one embodiment.

Another general embodiment of the present invention, which can be described for example with reference to FIGS. 5-6, includes a cable 100 having an ESD dissipative layer. The cable 100 includes a plurality of leads 102 and an ESD dissipative layer 104 operatively coupled to the leads 102, the ESD dissipative layer 104 being characterized as being at least one of translucent, semi-transparent or transparent. A metallic layer 302 is operatively coupled to the leads 102, the metallic layer 302 being characterized as being at least one of translucent, semi-transparent or transparent.

Yet another general embodiment of the present invention, which can be described for example with reference to FIGS. 4-6, includes a cable 100 having a plurality of leads 102, and a metallic layer 302 operatively coupled to the leads 102, the metallic layer 302 being characterized as being at least one of translucent, semi-transparent or transparent. The metallic layer is a thin metal film and is not used as a conductive layer for RF or EMI shielding. One can use metal ground planes for RF and EMI shielding, as is current practice for many cables. An insulating layer 302 is preferably positioned between the metallic layer and the leads.

Note that while the various figures described herein are shown with similar stacks of layers on both sides of the leads, variations of the cables may include dissimilar stacks of layers on opposite sides of the cable, and even a single insulating, metallic, ESD dissipative, and/or other layer on one side of the leads.

Various embodiments use a translucent, semi-transparent or transparent ESD dissipative layer as at least one outer layer of the cable. Preferably, enough light is permitted to pass through the layer that one is enabled to optically view the underlying lead structures and verify that they meet dimensional specifications. For instance, an illustrative semi-transparent layer allows transmission of at least 25% of light therethrough, preferably greater than about 50% of light therethrough. Illustrative translucent layers may have similar light transmissivity.

The ESD dissipative layer preferably has a thickness sufficient to exhibit an ESD surface resistivity in the range of about $10^6$ to about $10^{12}$ ohms/sq (ohms per square). In particularly preferred embodiments, the ESD dissipative surface resistivity is in the range of about $1 \times 10^6$ to $1 \times 10^8$ ohms/sq. For example, one illustrative embodiment has an ESD dissipative surface resistivity in the range of about $0.5 \times 10^7$ to about $1.5 \times 10^7$ ohm/sq. In a further embodiment, the ESD dissipative surface resistivity is about $1 \times 10^7$ ohms/sq. An ESD conductive surface on the cable in the disclosed range of conductivity should not conduct substantial RF or EMI currents, and should not noticeably electrically couple any leads or elements in the same cable together.

In various embodiments, an ESD dissipative layer is the external layer of the cable. However, the ESD dissipative layer can also be embedded in the cable.

The ESD dissipative coating may extend across a substantial portion of a particular side, or both sides, of the cable, e.g., >50%, more preferably >80%, even more preferably >90% of the surface area of the particular side (or sides) of the cable.

The particular composition of the translucent, semi-transparent or transparent ESD dissipative layer is not critical. One suitable ESD dissipative materials for forming the ESD dissipative layer is SPEC-STAT® ESD CLEAR #618-1-220 available from Lasco Services, 601 Compton, Irving, Tex. 75061. Another is SPEC-STAT® ESD CLEAR #618-1-200 from Lasco Services. Experimentation has shown that when a cable coated with SPEC-STAT® ESD CLEAR #618-1-220 is rubbed with a nitrile glove ten times, the cable does not display any significant surface charge (<10V versus >1000V if KAPTON is rubbed). Yet another is the "Antistatic PET Film" from Hangzhou Dahua Plastics Industry, Co. Ltd., 397 Tianmushan Road, Hangzhou P.R.C 310023, and having a light transmission of 88% per test method ASTM D1003 and a surface resistivity of $1\times10^9$ ohms/sq per test method GB/T13541. Yet another material is static dissipative polyethylene.

The bulk of the cable material can be any desired material including metal (e.g. copper, gold, etc.), insulating material (e.g., KAPTON), adhesives, liquid crystal, et.

In one embodiment, an ESD dissipative layer is applied to one or more of the outer surfaces of a premanufactured cable. Again, the bulk of the cable material can be any desired material. The ESD dissipative layer may be sprayed, painted on with an applicator, or otherwise applied to the cable in liquid or gel form in a thin layer by any suitable mechanism.

For example, one method for applying an ESD dissipative material such as SPEC-STAT® ESD CLEAR to a cable includes the following steps. Ensure that the cable to be painted is free of dirt, grease, oils and is dry. Position the cable about 10 to 12 inches from the spray nozzle. Spray with light sweeping action. Allow to dry so that it is not tacky to the touch. Apply a second coat. To accelerate drying, heated air can be blown against the cable after each application. Note that during application, it may be desirable to mask exposed leads of the cable that will eventually be electrically coupled to a sensor or other devices.

In other embodiments, the ESD dissipative layer is applied during cable manufacture. Methods such as those above as well as printing, e.g., Gravier printing; lamination; co-extrusion; etc. can be used.

In another embodiment, an ESD dissipative layer is bonded onto one or more of the surfaces of the cable. The ESD dissipative layer can be bonded to the cable by any suitable mechanism, including application of an appropriate adhesive such as heat-activated PYRALUX® sold by DuPont. Alternatively, the ESD dissipative layer can have an adhesive backing already formed thereon.

Particularly, a thin ESD dissipative polymer layer can be bonded to the surfaces of the cable. A preferred surface material is a thin polymer which has conductive materials interspersed to make the polymer sheet resistance in the range set forth above. One such material is KAPTON® XC polyimide film sold by DuPont. DuPont KAPTON® XC polyimide films are electrostatically dissipative, which are precisely loaded with conductive carbons to produce films with tightly controlled surface resistivities. The resistive property is throughout the bulk of the film, so it cannot be cracked, rubbed off or otherwise easily damaged, as if often the case with surface coatings or metallizations. In addition to antistatic properties, KAPTON® XC film provides inertness, radiation and temperature resistance similar to that of other KAPTON® films such as those typically used to construct cables. Experimentation has shown that when a cable coated with KAPTON® XC film is rubbed with a nitrile glove ten times, the cable does not display any significant surface charge (<10V versus >1000V if standard KAPTON material is rubbed).

KAPTON® 100XC10E7 is a one mil thick film with a nominal surface resistivity of $10^7$ ohm/sq. One mil equals one thousandth of an inch (0.0254 millimeter). Custom constructions are also available from DuPont, and can be produced in thickness from 1 to 5 mil, and with surface resistances from 20 to $10^9$ ohms/sq. KAPTON® 100XC10E7 film is supplied in rolls.

Regarding the metallic layer, many metals may be used, with aluminum, nickel and copper being particularly preferred. Whether the metallic layer is translucent, semi-transparent or transparent depends primarily on a thickness of the metallic layer. In general, the thinner the layer, the higher resistivity it will have, as well as higher light transmissivity. Thicknesses of the metal layer less than about 0.1 mm are preferred, with thicknesses less than about 0.001 mm being particularly preferred. In one approach, the metallic layer, e.g. of Al, is less than about 100 Å thick, e.g. about 80 Å, 50 Å, 40 Å, etc.

The metallic layer may be conductive or nonconductive. A metal can be considered conductive if it has a volume resistivity of less than $1\times10^4$ ohm·cm as defined by ANSI/EIA-541-1988. According, a metal can be considered nonconductive if it has a volume resistivity of greater than $1\times10^4$ ohm·cm as defined by ANSI/EIA-541-1988. In one embodiment, the metallic layer exhibits a surface resistivity greater than about 80 ohm/sq, and preferably greater than about 95 ohm/sq. In a particularly preferred approach, the metallic layer exhibits a surface resistivity on the order of about 100 ohm/sq.

In one approach, the metallic layer is formed by vapor deposition of a metal in a vacuum chamber. In another approach, the metal is sputtered.

The metallic layer found in various embodiments herein can also be considered an ESD dissipative layer if it has properties similar to the ESD dissipative layers described herein. Accordingly, in any of the embodiments described herein, and permutation thereof, a metallic layer may replace and/or complement an ESD dissipative layer.

Therefore, one creating a cable having a metallic layer that is translucent, semi-transparent or transparent and also ESD dissipative may readily determine the preferred thickness for a given metal providing the aforementioned attributes by reference to electrical properties and light transmissivity-to-thickness data for the particular metal used.

Cables in some embodiments may further include a ground plane, though such ground planes often provide undesirable capacitive coupling to the environment. Preferably, the metallic layer does not act as a ground plane.

FIG. 1 illustrates a cross section of a cable 100 having a lead 102 of a metal or other conductive material, and an ESD dissipative layer 104 coupled to the lead 102. An insulating layer 105 is coupled to the lead 102 opposite the ESD dissipative layer 104. Note that additional layers can also be present. Further, as mentioned above, a metallic layer can be used as, or be integrated with, one or more of the ESD dissipative layers 104.

FIG. 2 illustrates a cross section of a cable 100 having a lead 102 of a metal or other conductive material, adhesive layers 106 skirting the lead 102, and ESD dissipative layers 104 coupled to the adhesive layers 106. Note that layers can be added or removed per the desires of the designer or requirements of the particular application. Further, as mentioned above, a metallic layer can be used as, or be integrated with, one or more of the ESD dissipative layers 104.

FIG. 3 illustrates a cross section of cable 100 having a lead 102 of a metal or other conductive material, inner adhesive layers 106 skirting the lead 102, backing layers 202 coupled to the inner adhesive layers 105, outer adhesive layers 204 skirting the backing layers 202, and ESD dissipative layers 104 coupled to the outer adhesive layers 204. The backing layers 202 are preferably electrically insulative, but need not be. To allow the aforementioned visual inspection of the lead 102, at least one of the backing layers 202 and a corresponding ESD dissipative layer 104 is at least one of translucent, semi-transparent or transparent. Note that layers can be added or remove per the desires of the designer or requirements of the particular application. Further, as mentioned above, a metallic layer can be used as one or more of the ESD dissipative layers 104.

In a variation on the above-described embodiment or in any embodiment having a metallic layer, the metallic layer may be located on only one side of the cable.

FIG. 4 illustrates a cross section of a cable 100 having a lead 102 of a metal or other conductive material, insulating layers 304 of any suitable material skirting the lead 102, and metallic layers 302 coupled to the insulating layers 304. Illustrative material from which the insulating layers can be constructed include KAPTON, polymer films such as polyester, etc. An abrasion layer (not shown) may also be present on the outside of the metallic layers 302 to protect them from scratching, flaking, and being rubbed off. Note that layers can be added or removed per the desires of the designer or requirements of the particular application. To allow the aforementioned visual inspection of the lead 102, the layers on at least one side of the cable are at least one of translucent, semi-transparent or transparent.

FIG. 5 illustrates a cross section of a cable 100 having a lead 102 of a metal or other conductive material, insulting layers 394 skirting the lead 102, metallic layers 302 coupled to the insulating layers 304, and ESD dissipative layers 104 coupled to the metallic layers 302 and positioned towards or at the outer surface of the cable 100. Note that layers can be added or removed per the desires of the designer or requirements of the particular application. To allow the aforementioned visual inspection of the lead 102, the layers on at least one side of the cable are at least one of translucent, semi-transparent or transparent.

FIG. 6 illustrates a cross section of a cable 100 having a lead 102 of a metal or other conductive material, ESD dissipative layers 104 skirting the lead 102, and metallic layers 302 coupled to the ESD dissipative layers 104 and positioned towards or at the outer surface of the cable 100. Note that layers can be added or removed per the desires of the designer or requirements of the particular application. To allow the aforementioned visual inspection of the lead 102, the layers on a least one side of the cable are at least one of translucent, semi-transparent or transparent.

Figure 7:
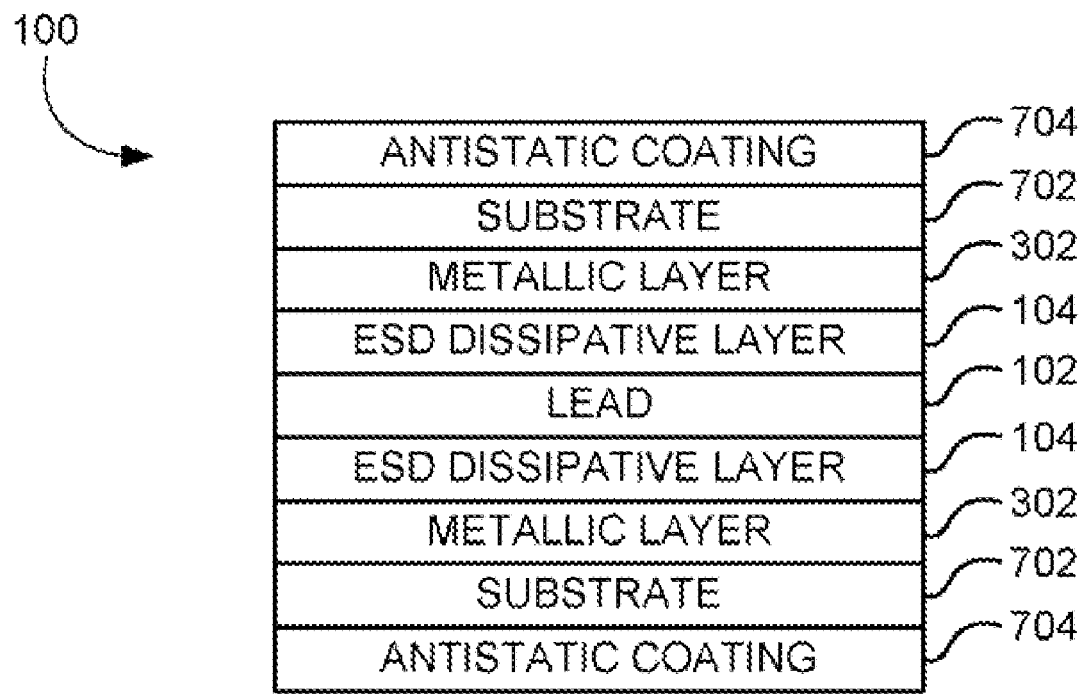
FIG. 7 is a simplified partial cross sectional view, not to scale, of a cable having ESD dissipative layers and metallic layers according to one embodiment.

FIG. 7 illustrates a cross section of a cable 100 having a lead 102 of a metal or other conductive material, ESD dissipative layers 104 skirting the lead 102, metallic layers 302 coupled to the ESD dissipative layers 104, and a film 702 with an antistatic coating 704. The film 702 may be any suitable substrate for the antistatic coating 704. For example, the film 702 can be polymeric, e.g., of polyester. Note that layers can be added or removed per the desires of the designer or requirements of the particular application. To allow the aforementioned visual inspection of the lead 102, the layers on at least one side of the cable are at least one of translucent, semi-transparent or transparent.

The antistatic coating 704 can be formed of any antistatic material known in the art. Note that the antistatic coating is not to be confused with an ESD dissipative material, which dissipates charge by electrical conduction through the bulk of the material or on its surface. An antistatic material reduces the probability of tribocharging when two surfaces rub together.

The embodiments shown in FIGS. 5-7 provide the dissipative attributes of the embodiments shown in FIG. 2, but include a metal shield (metallic layer 302) and dielectric (insulating layer 304) to stop static from crossing from the outer surface of the shield to the leads.

In a further embodiment, an ESD dissipative layer is used as the insulator for the cable. See, for example, the embodiments for FIGS. 1-2, which can be easily adapted to such an embodiment.

In any of the embodiments described herein, the ESD dissipative layer and other layers (not including the lead or optional conductive backplane or ground plane) has an electrical resistivity that is sufficient to prevent shorting of the conductors and leads in the cable, as well as not significantly interfere with the signal being sent through the cable.

Table 1 lists results of experiments measuring the tribocharging potential of various sheet materials. In the "rubbed with nitrile gloves" experiments, a clean sheet of the material was rubbed with nitrile gloves ten times with one inch strokes. In the "peeling off from paper" experiments, a paper backing was peeled off of the material.

TABLE 1

| Material | Rubbed with Nitrile glove Voltage (Volts) | Peeling off from paper Voltage (Volts) |
|---|---|---|
| Kapton XC 10^7 ohm/sq | Insignificant | Insignificant |
| Kapton CPB 10^12 ohm/sq | 50-400 | >3000 |
| LCP 3600 F02053 | 200-3000 | >3000 |
| Kapton/Pyralux, LF7001 Dupont | >1000 | >3000 |
| LCP 3800 | >1500 | >3000 |
| LCP 212141 | >1000 | >3000 |

Expanding on the results shown in Table 1, rubbing a cable (KAPTON CBP (polyimide) cleaned with isopropyl alcohol) with nitrile gloves charges the cable to over 250±100V.

Rubbing a clean sheet (Kapton LF7001 (polyimide) with a finger or nitrile gloves charges the cable to over 1600V. Charge dissipation times are: 11, 102 and 450 seconds for 75%, 50%, 90% dissipation, respectively. The external voltage from the charged surface is dramatically shielded when the KAPTON sheet is placed over a metal (aluminum foil) but the external voltage "reappears" when the metal sheet is removed, indicating that the metal sheet insulated the charges on the KAPTON from external detection without removing the charges, thus hiding the potentially damaging charges from detection. The voltage with height drops by ~3.4% per mm.

Rubbing a clean cable (Kapton XC (polyimide with a small percentage of conductive graphite, $10^7$ $\Omega$/sq)) with nitrile gloves results in no noticeable tribocharging, even when holding with an insulator.

The cables thus described with an ESD dissipative layer and/or metallic layer are effectively immune to charge build up and thus eliminate this mechanism as a source of ESD or EOS damage. The cables described herein are suitable for use with any device or electronic component for which ESD or EOS protection is desired. The cables are especially useful when coupled to MR sensors in magnetic storage devices such as tape drives and disk drives.

Further, the preferred methods thus described to not significantly affect the cable mechanical properties such as bending stiffness or weight, making them preferable to other ESD and EOS prevention devices whose weight can interfere with actuation of the tape or disk heads.

Figure 8:
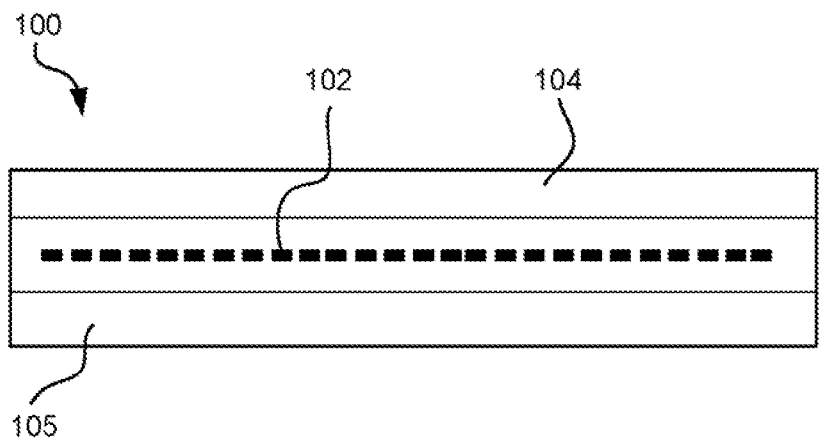
FIG. 8 is a simplified cross sectional view, not to scale, of a cable having multiple leads according to one embodiment.

FIG. 8 depicts a cross section of an illustrative cable 100 similar to that of FIG. 1, taken perpendicular to a longitudinal axis of the cable. Several leads 102 are shown, though the number of leads is not critical. One skilled in the art will appreciate that the number of leads in a particular implementation will depend primarily on the intended application of the cable.

Figure 9:
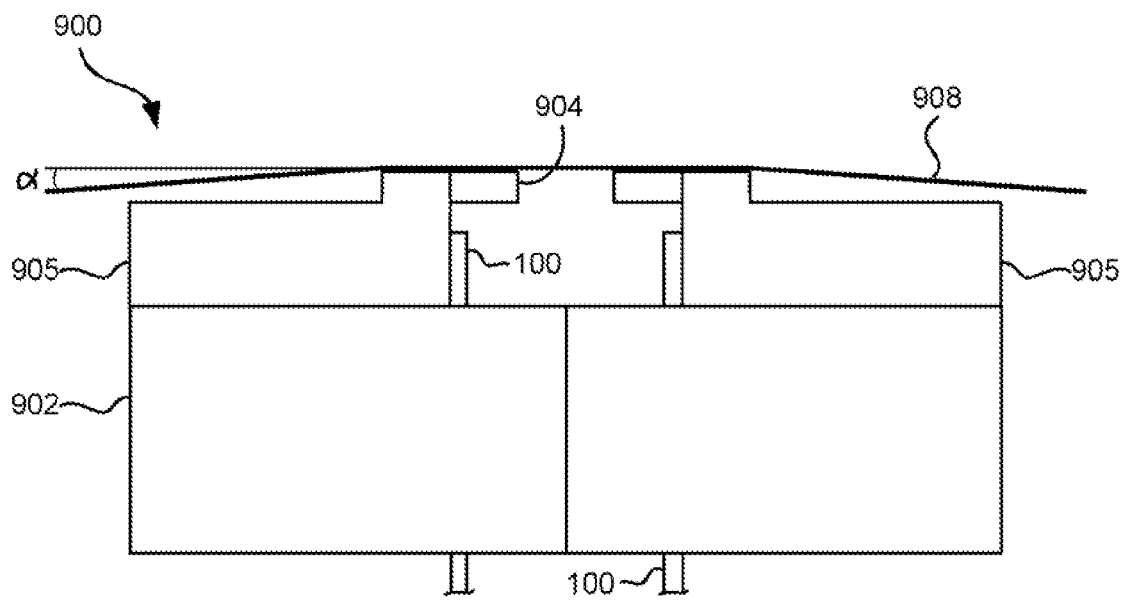
FIG. 9 is a partial side view of a tape head in use.

FIG. 9 illustrates a cable 100 in use. As shown, FIG. 9 illustrates a completed head for a read-while-write bidirectional linear tape drive. "Read-while-write" means that the read elements follows behind the write element. This arrangement allows the data just written by the write element to be immediately checked for accuracy and true recording by the trailing read element. Specifically, in FIG. 9, a tape head 900 comprising two modules 905 are mounted on a ceramic substrate 902 which are, in turn, adhesively or otherwise physically coupled. Each of the modules 905 includes several read sensors and/or write transducers electrically coupled to pads (not shown) for subsequent attachment to external electronic devices. Closures 904 are coupled to the modules 905 to support the tape and protect the read/write elements from wear by the tape. Conductive leads in the cables 100 are fixedly and electrically coupled to the pads. The tape 908 wraps over the modules 905 at a predetermined wrap angle α. The closures 904 are typically angled relative to each other such that the tape 908 wraps over the closures 904 at a predetermined wrap angle.

Additionally, in the manufacture of cables, with thin leads, such as those required for modern tape head products, a yield issue is associated with variability in the lead widths. X-rays could be used to inspect the leads, but this is a costly solution. Thus, a translucent, semi-transparent or transparent ESD dissipative external layer may both reduce the ESD damage issue and allow for inspection of the leads. The translucent, semi-transparent or transparent ESD dissipative layer may be present on at least one surface of the cable to optically view the underlaying metal structures and verify that they meet dimensional specifications. Of course, any additional layers adjacent to the ESD dissipative layer may also be translucent, semi-transparent or transparent as well to allow the visual inspection.

Figure 10:
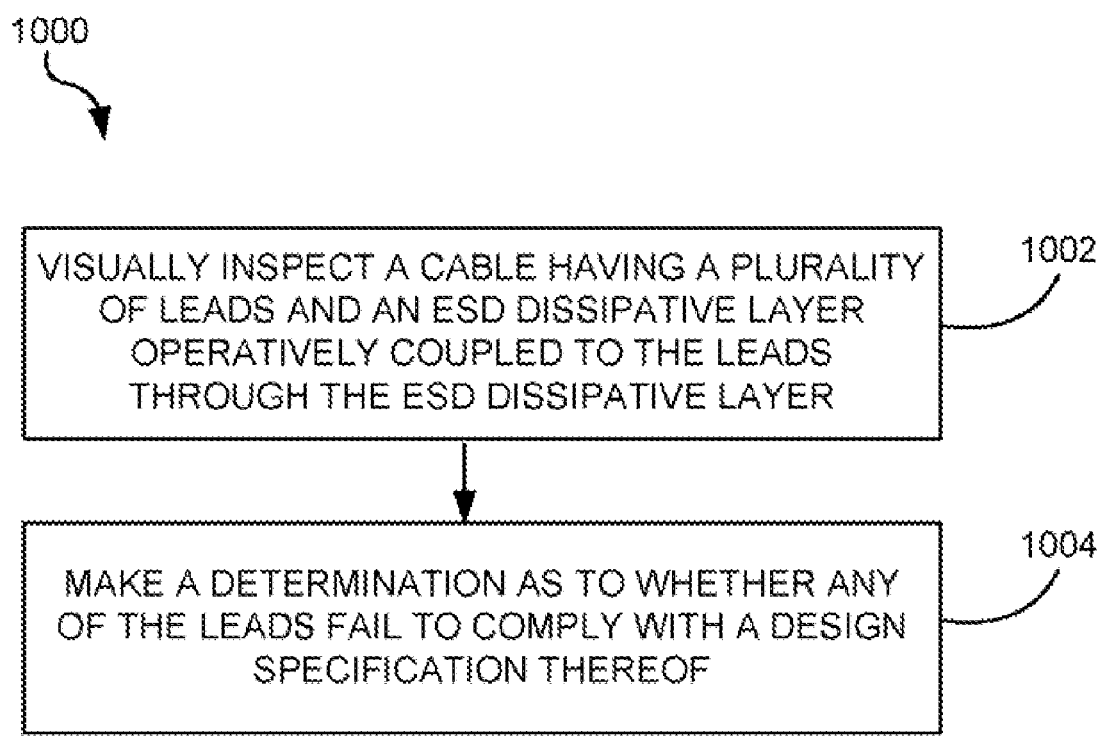
FIG. 10 is a process diagram of a method for visually inspecting leads of a cable having an ESD dissipative layer.

Methods for visually inspecting leads of a cable having an electrostatic discharge (ESD) dissipative layer are also provided. One embodiment 1000 is shown in FIG. 10. In step 1002, a cable having a plurality of leads and an ESD dissipative layer operatively couple to the leads if visually inspected through the ESD dissipative layer. The ESD dissipative layer is characterized as being at least one of translucent, semi-transparent or transparent. Such visual inspection may be performed by a human, by a machine, or a combination thereof. Note also that light in a wavelength outside the human visible spectrum may be employed during the method. In step 1004, a determination is made as to whether any of the leads fail to comply with a design specification thereof. Such determination may be based on a design specification, comparison to a comparative model, optical measurements of the lead dimensions, etc.

Although various embodiments have been described as adapted for use with a magnetic tape storage system, the inventive cables may also be used with other electronic devices such as magnetic recording systems and applications using a sensor to detect a magnetic field, optical storage devices, wireless telephones, personal computers, PDAs, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A cable having an electrostatic discharge (ESD) dissipative layer, comprising:
    a pluraliry of leads; and
    an ESD dissipative layer operatively coupled to the leads, the ESD dissipative layer being characterized as being at least one of translucent, semi-transparent or transparent,
    wherein the cable is flexible,
    wherein the ESD dissipative layer also functions as an electrical insulator for the leads,
    wherein no other insulator excluding an adhesive is present on one side of the leads.

2. A cable as recited in claim 1, wherein the ESD dissipative layer has an ESD dissipative surface resistivity of from about $1 \times 10^6$ to about $1 \times 10^{12}$ ohm/sq.

3. A cable as recited in claim 1, wherein the ESD dissipative layer has an ESD dissipative surface resistivity of from about $1 \times 10^6$ to about $1 \times 10^8$ ohm/sq.

4. A cable as recited in claim 1, wherein no other insulator excluding an adhesive is present.

5. A cable as recited in claim 1, wherein the ESD dissipative coating extends across a substantial portion of the one side of the cable.

6. A cable as recited in claim 1, further comprising an electrically insulating layer positioned between the leads and the ESD dissipative coating, the electrically insulating layer being characterized as being at least one of translucent, semi-transparent or transparent, wherein the leads are substantially electrically isolated from the ESD dissipative layer.

7. A cable as recited in claim 1, wherein the ESD dissipative coating is a layer of polymeric material having conductive materials interspersed therein.

8. A cable having an electrostatic discharge (ESD) dissipative layer, comprising:
    a plurality of leads;
    an ESD dissipative layer operatively coupled to the leads, the ESD dissipative layer being characterized as being at least one of translucent, semi-transparent or transparent; and
    a metallic layer operatively coupled to the leads, the metallic layer being characterized as being at least one of translucent, semi-transparent or transparent,
    wherein the cable is flexible,
    wherein the metallic layer is positioned on only one side of the cable.

9. A cable as recited in claim 8, wherein the ESD dissipative layer has an ESD dissipative surface resistivity of from about $1 \times 10^6$ to about $1 \times 10^{12}$ ohm/sq.

10. A cable as recited in claim 8, wherein the ESD dissipative layer has an ESD dissipative surface resistivity of from about $1 \times 10^6$ to about $1 \times 10^8$ ohm/sq.

11. A cable as recited in claim 8, wherein the metallic layer is positioned on both sides of the cable.

12. A cable as recited in claim 8, wherein the metallic layer is less than about 100 Å thick.

13. A cable as recited in claim 8, wherein the metallic layer is a thin metal film with a surface resistivity greater than about 80 ohm/sq.

14. A cable as recited in claim 8, wherein the metallic layer is aluminum.

15. A cable having an electrostatic discharge (ESD) dissipative layer, comprising:
    a plurality of leads;
    an ESD dissipative layer operatively coupled to the leads, the ESD dissipative layer being characterized as being at least one of translucent, semi-transparent or transparent; and a metallic layer operatively coupled to the leads, the metallic layer being characterized as being at least one of translucent, semi-transparent or transparent, wherein the cable is flexible, wherein the metallic layer is positioned between the leads and the ESD dissipative layer.

16. A cable having a metallic layer, comprising:

a plurality of leads;

a metallic layer operatively coupled to the leads, the metallic layer being characterized as being at least one of translucent, semi-transparent or transparent, wherein the metallic layer has a volume resistivity of greater than $1 \times 10^4$ ohm·cm as defined by ANSI/EIA-541-1988; and an insulating layer positioned between the metallic layer and the leads.

17. A cable as recited in claim 16, further comprising an ESD dissipative layer operatively coupled to the leads, the ESD dissipative layer being characterized as being at least one of translucent, semi-transparent or transparent, wherein the cable is flexible.

18. A method for visually inspecting leads of a cable having an electrostatic discharge (ESD) dissipative layer, the method comprising:

visually inspecting a flexible cable having a plurality of leads and an ESD dissipative layer operatively coupled to the leads through the ESD dissipative layer, wherein the ESD dissipative layer is characterized as being at least one of translucent, semi-transparent or transparent; and determining whether any of the leads fail to comply with a design specification thereof, wherein the cable is flexible, wherein the ESD dissipative layer also functions as an electrical insulator for the leads, wherein no other insulator excluding an adhesive is present on one side of the leads.

* * * * *